No. 862,422. PATENTED AUG. 6, 1907.
G. H. TREADGOLD.
EMERGENCY WHEEL.
APPLICATION FILED MAY 21, 1906.
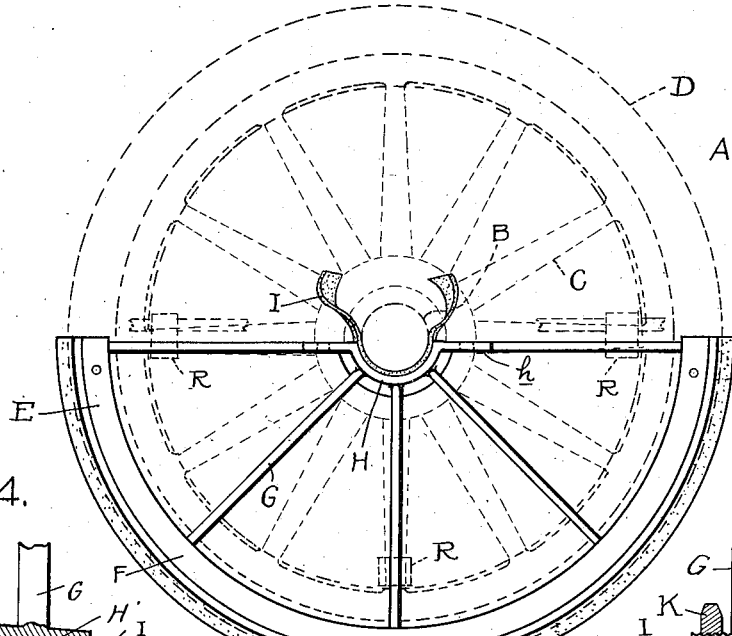
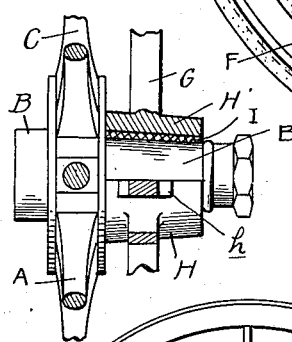
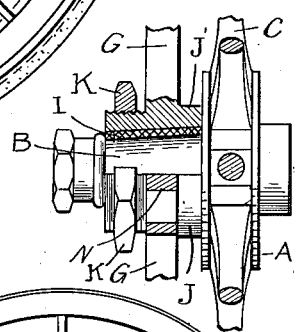
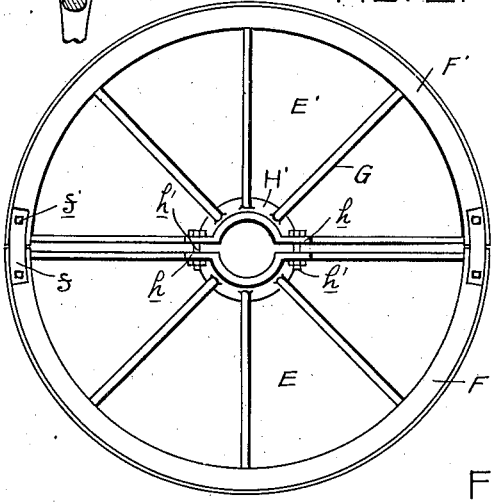
WITNESSES
INVENTOR
GEORGE H. TREADGOLD
BY
ATT'YS.

UNITED STATES PATENT OFFICE.

GEORGE H. TREADGOLD, OF PORT HURON, MICHIGAN.

EMERGENCY-WHEEL.

No. 862,422.  Specification of Letters Patent.  Patented Aug. 6, 1907.

Application filed May 21, 1906. Serial No. 318,080.

*To all whom it may concern:*

Be it known that I, GEORGE H. TREADGOLD, a citizen of the United States of America, residing at Port Huron, in the county of St. Clair and State of Michigan, have invented certain new and useful Improvements in Emergency-Wheels, of which the following is a specification, reference being had therein to the accompanying drawings.

My invention relates to new and useful improvements in wheels and particularly to an emergency wheel which may be applied to the wheel of an automobile or other vehicle in case the tire of the permanent wheel is punctured or otherwise deflated, or the wheel itself is injured.

The invention consists in the novel arrangement and combination of parts as will be more fully hereinafter described and set forth in the claims.

In the drawings, Figure 1 shows a side elevation of an automobile wheel with a portion of the emergency wheel applied; Fig. 2 is a side elevation of the assembled emergency wheel, and Fig. 3 is a side elevation of a modified form of emergency wheel. Figs. 4 and 5 are longitudinal elevations partly in section of wheel hubs with the emergency wheel hubs applied.

A is the ordinary wheel of an automobile, or other vehicle, and comprises the hub B, the spokes C, and the tire D.

The emergency wheel preferably consists of complementary sections E and E' comprising complementary felly sections F and F', spokes G, and complementary hub sections H and H'. The hub sections are preferably provided with oppositely projecting lugs h, and in assembling the wheel the lugs h on the section H are secured to the lugs h on the section H' by bolts h'.

The felly sections are attached to each other at their meeting ends by means of segmental straps or clips f secured thereto by bolts f' passing through suitable apertures. If desired straps f may be provided for each side of the sections.

The hub sections are arranged to fit the hub B of the vehicle wheel. I have shown the hub B as conical and consequently the aperture between the hub sections is conical, but it is obvious that said aperture may be made cylindrical to fit cylindrical hubs when desired. To prevent marring the hub B, a collar I of leather or other suitable material is preferably inserted between said hub and the emergency sections, and may be integral, as shown, or in two sections.

In Fig. 3 I have shown a modified construction in which the outer surfaces of the hub sections J and J' are threaded to engage a suitable taper nut K. The wheel sections O and O' are further connected by bolts L passing through spokes M and M' and N and N' respectively.

The wheel sections are preferably provided with suitable metal or solid rubber tires as shown at P and are of a slightly greater radius than the radius of the vehicle wheel when the tire thereof is deflated in order that when the emergency wheel is applied thereto it will take the load from the deflated tire.

The operation of the device is as follows: When a tire of the vehicle wheel is punctured or the wheel or tire is otherwise injured, the operator applies one of the sections to the side of that portion of the injured wheel which is off the ground and secures it thereto by suitable clips or leather straps R engaging the spokes of the two. He then moves the vehicle to rotate the wheel until the section rests on the ground and sustains the load as shown in Fig. 1 and the section thus operates as a jack. The second section is then applied and secured to the first, and the vehicle is then ready to proceed without damage to the deflated tire.

What I claim as my invention is:

1. The combination with a vehicle wheel, of a wheel of normally greater diameter than said vehicle wheel and arranged to be detachably secured thereto to take the load therefrom, substantially as described.

2. The combination with a vehicle wheel, of a wheel of normally greater diameter than said vehicle wheel and arranged to be detachably secured to the hub thereof to take the load therefrom, for the purpose described.

3. The combination with a vehicle wheel, of a sectional wheel arranged to be secured to the side of said vehicle wheel to take the load therefrom, for the purpose described.

4. The combination with a vehicle wheel, of a wheel formed of complementary sections detachably secured to one end of the hub of said vehicle wheel for the purpose described.

5. The combination with a vehicle wheel, of a wheel section of greater radius arranged to be secured to the side thereof whereby the vehicle wheel may be rotated to transfer the load to said wheel section and a complementary wheel section arranged to be secured to said first section and said vehicle wheel, for the purpose described.

6. The combination with a vehicle wheel, of complementary wheel sections, means for securing said sections to each other near their peripheries, and means for securing the hub sections to each other and to the hub of said vehicle wheel.

7. The combination with a vehicle wheel, of complementary wheel sections, means for securing said sections to the spokes of said vehicle wheel, and means for securing said sections to each other and to the hub of said vehicle wheel.

In testimony whereof I affix my signature in presence of two witnesses.

GEORGE H. TREADGOLD.

Witnesses:
 RALPH J. PARKELL,
 ED. J. RODGERS.